United States Patent [19]

Levin

[11] 3,978,767

[45] Sept. 7, 1976

[54] AUTOMATIC CENTER HOLDING FIXTURE FOR AN ANNULAR WORKPIECE

[75] Inventor: Morris B. Levin, Chicago, Ill.

[73] Assignee: Joel C. Levin, University City, Mo.

[22] Filed: July 11, 1974

[21] Appl. No.: 487,626

[52] U.S. Cl. .......................... 90/58 B; 90/DIG. 24; 279/2 A; 279/4; 279/122
[51] Int. Cl.² ...................... B23B 31/40; B23Q 1/16
[58] Field of Search ................ 279/4, 2 R, 2 A, 1 G, 279/11 D, 121, 122, 123, 5; 90/56 R, 58 B, DIG. 24

[56] References Cited
UNITED STATES PATENTS

| 128,260 | 6/1872 | Taylor | 279/2 |
|---|---|---|---|
| 2,358,918 | 9/1944 | Floto | 279/2 |
| 2,894,757 | 7/1959 | Schustack | 279/110 X |
| 2,949,313 | 8/1960 | Moser et al. | 279/2 A |

FOREIGN PATENTS OR APPLICATIONS

| 212,712 | 2/1968 | U.S.S.R. | 279/2 |

Primary Examiner—Othell M. Simpson
Assistant Examiner—Z. R. Bilinsky
Attorney, Agent, or Firm—Silverman & Cass, Ltd.

[57] ABSTRACT

An apparatus for gripping the interior surface of an annular opening in a workpiece includes a baseplate and a set of elements circularly arranged and coaxial with a shaft or stud extending through and perpendicular to the baseplate. The elements are circumferentially spaced apart and are slidable radially of the shaft.

Each element has a pair of aligned curved slots opening respectively to the opposite circumferential ends thereof. Biasing springs are secured to the baseplate and positioned thereon to extend from a slot in one element to the adjacent slot in the adjacent element. These biasing springs bear against the side surfaces of adjacent slots for biasing the elements radially inwardly to a contracted position. An actuating member which is in the shape of a camming disc, is movable relative to the baseplate and cooperates with the elements to move them radially outwardly so that they engage and grip the interior surface of the opening in the workpiece.

9 Claims, 7 Drawing Figures

AUTOMATIC CENTER HOLDING FIXTURE FOR AN ANNULAR WORKPIECE

BACKGROUND OF THE INVENTION

This invention relates generally to an apparatus for gripping and holding workpieces, generally defined as workholders, chucks, or sockets in the United States Patent Office classifications, and more particularly is concerned with apparatus which automatically grips and holds the walls forming the aperture in an apertured workpiece.

Up to the present time, milling machines used for milling large workpieces such as, for example, truck or clutch parts, have used conventional rotary indexing mechanisms. One such mechanism commonly used is manufactured by Air Hydraulics, Inc. of Jackson, Mich., and is identified as their Model "H" index table. Indexing tables are usually pneumatic and will include a plate or table to which the workpiece to be milled is clamped. In most cases, clamping members for each workpiece are fabricated and attached to the indexing table. These clamping members generally include wrench-tightenable or lever-actuated members for clamping the workpiece therein. Of course, the operator of the machine must manipulate a wrench to attach and remove the workpiece from the clamping member or insert the workpiece and manipulate the lever. These manipulations are time-consuming and require some judgment as to how tight to turn the nuts onto the bolts and the placement of the workpiece in the clamping member. Any inaccuracy in placement or a failure sufficiently to tighten the workpiece into the clamping members can cause an inaccuracy in the milled workpiece causing the workpiece to be scrapped and resulting in a loss to the manufacturer.

Automatically actuated mandrels have been provided for gripping and holding various types of items including workpieces in certain applications; however, these devices are generally quite complex in structure making them difficult and expensive to manufacture. More importantly, these devices are not capable of being adapted for use on milling machines with automatic indexing tables when the workpieces and the gripping devices must be rotated as a part of the milling operation.

SUMMARY OF THE INVENTION

In practicing the invention, apparatus is provided for gripping the interior surface of an annular opening in the center of a generally circular workpiece to enable operating upon the edges and/or surfaces by a milling cutter, for example.

The apparatus includes a baseplate with a central shaft extending through the baseplate perpendicular thereto. The shaft comprises the piston or a part of a piston moving in a fluid cylinder and acts when the cylinder is operated to move axially under the control of the operator of the apparatus. A set of generally arcuate gripping elements is arranged in a circle about the shaft and coaxially therewith, the elements being circumferentially spaced apart. The elements are slidable on the base and are intended to be moved radially outward of the shaft for gripping the workpiece and radially inward toward the shaft for releasing the workpiece. These movements are effected, respectively, by the operation of the cylinder pulling the shaft downward relative to the baseplate and by releasing the pressure to the cylinder to permit biasing means which will be described to move at least a portion of each element radially inward while at the same time slightly raising the shaft.

Each element is generally in the form of a sort of curved "H" with the center bridge of the "H" being radial relative to the axis of the shaft. By this construction, each element has a pair of aligned curved slots opening respectively to the opposite circumferential end thereof. The elements may be formed as integral members or as a plurality of parts coupled together to form each element. In the preferred embodiment there is an inner arcuate part, an outer arcuate part and a key coupling them together but permitting relative radial movement of the arcuate parts with respect to one another.

The curved slots are formed between the inner and outer arcuate parts.

Biasing structure is secured to the baseplate bridging between the curved slots of adjacent arcuate elements such biasing structure comprising a plurality of individual leaf springs, one provided between each pair of elements. Each leaf spring normally bears against the radially outer surfaces of adjacent aligned inner arcuate parts so that at least these parts tned to move inwardly in response to the action of all of the springs combined. Where the outer arcuate parts are integral with or not separable from the inner arcuate parts, the outer parts would also be biased to move radially inward by the leaf springs. Where the outer parts are separable from the inner parts, they may not move when the inner parts are moved.

An actuating member is secured to the shaft above the baseplate in the forming of a camming disc engaging and cooperating with camming surfaces provided on the radially inward edges of the arcuate gripping elements. The camming action is such that downward movement of the shaft will force the gripping elements to move radially outward. The outer surfaces of the gripping elements, formed on the outer curved parts thereof, are formed to conform to the annular interior surface of the workpiece and thus they frictionally engage the workpiece and hold the same to the baseplate. Where the parts of the gripping elements are separable, different outer arcuate parts may be substituted for different diameter center annular openings in different series of workpieces. Friction contact pins having carbide points may be provided on the outer arcuate parts and these may be adjustable radially so that the same outer arcuate parts are usable with slightly different diameter annular openings.

In use the air cylinder is relaxed when the workpiece is placed over the set of gripping elements. The cylinder is then operated and the center camming member pulled downward forcing the gripping elements radially outward to hold the workpiece. The indexing table can now be worked without releasing the workpiece which is milled. When the operations on the particular workpiece have been completed, the workman releases the air to the air cylinder, the leaf springs contract at least the inner arcuate parts. The workman then lifts the workpiece off the baseplate and in doing so will normally move the outer arcuate parts slightly inward if they haven't already been retracted by th action of the leaf springs.

DETAILED DESCRIPTION OF THE PREFERRED EMBODIMENT

Figure 1:
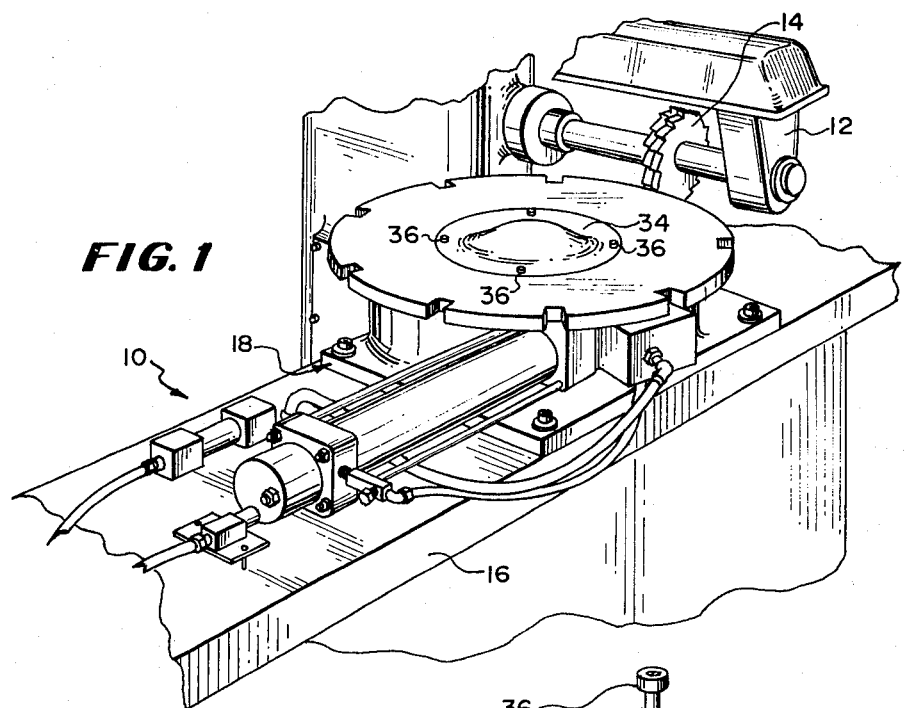
FIG. 1 is a perspective view of a milling machine with a workpiece mounted on an indexing table and the apparatus of this invention.

Referring to FIG. 1, there is shown a milling machine generally designated by the reference character 10, including an arm 12 which mounts a rotating cutting or milling wheel 14. A milling table 16 on the milling machine 10 mounts a pneumatically operated indexing table 18 to which the apparatus of this invention is secured. A workpiece 20 to be milled is seated on indexing table 18 and secured thereto by the apparatus of this invention. Milling table 16 is movable relative to milling machine arm 12 so that workpiece 20 can be moved towards and away from milling cutter 14 for cutting or milling slots 22 in the periphery of workpiece 20. The milling table 16 moves workpiece 20 into milling cutter 14 until the full slot 22 is milled. When the correct depth has been reached milling table 16 automatically withdraws and during the withdrawal cycle indexing table 18 indexes workpiece 20 to the next position for milling the next slot 72 in the sequence. The indexing mechanism is not shown but is well-known.

Figure 2:
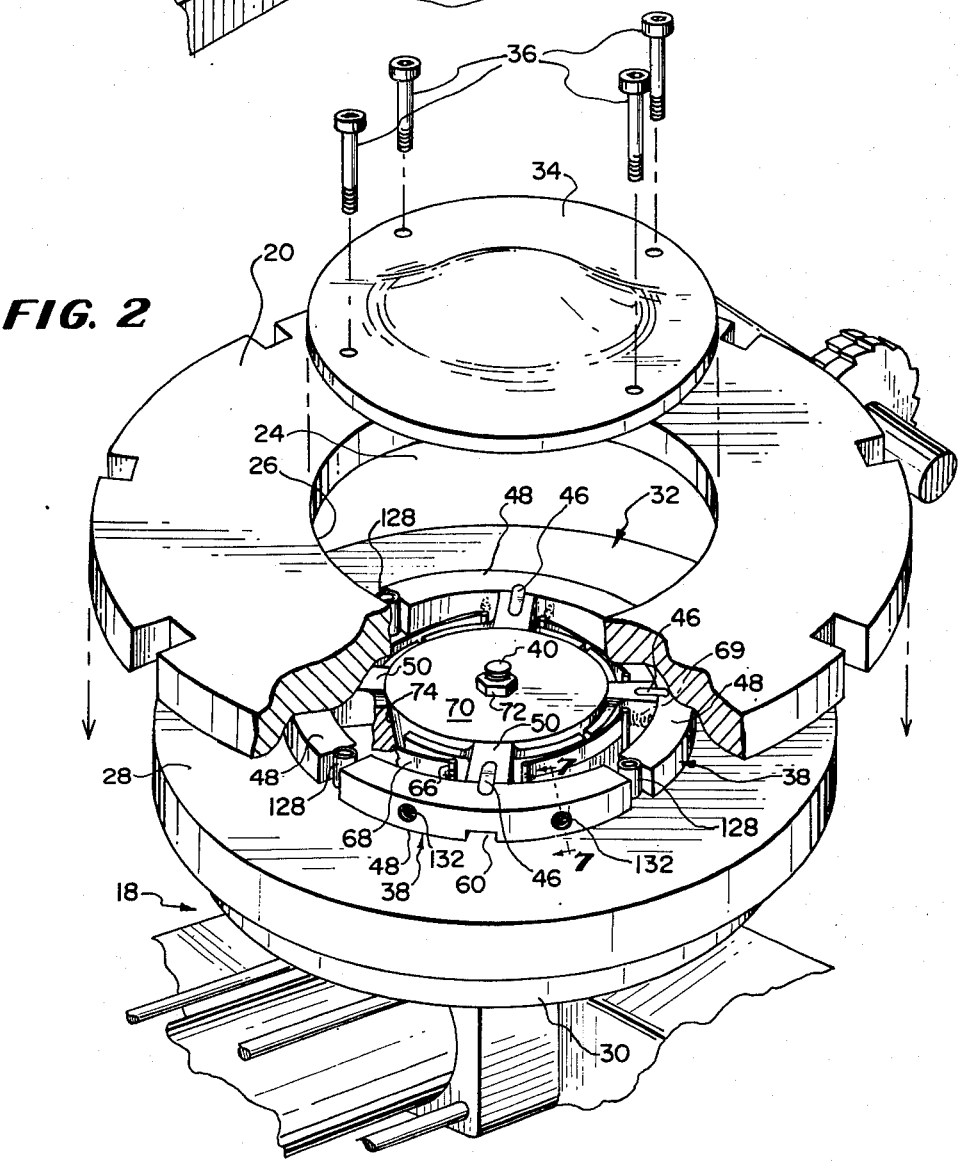
FIG. 2 is an exploded perspective view of the apparatus of this invention shown mounted on an indexing table.

Referring to FIG. 2, workpiece 20 and the apparatus of this invention are shown in greater detail. Workpiece 20 includes a center aperture 24 formed by inner surface or side walls 26. In the embodiment shown workpiece 20 seats on a baseplate 28 of the apparatus which is secured to the annular rotary mounting table 30 of indexing table 18. The baseplate 28 will be described subsequently in greater detail. The gripping mechanism of the apparatus, identified generally as 32 is seated on and secured to baseplate 28. The gripping mechanism 32 seats in aperture 24 of workpiece 20 and grips or holds inner side walls 26 for securing workpiece 20 in its proper position during the milling operation. A coverplate 34, which encloses mechanism 32, is secured to baseplate 28 by mounting bolts 36 and acts to prevent the various components of mechanism 32 from being jarred out of place while also preventing entry of foreign matter into the mechanism 32.

Figure 3:
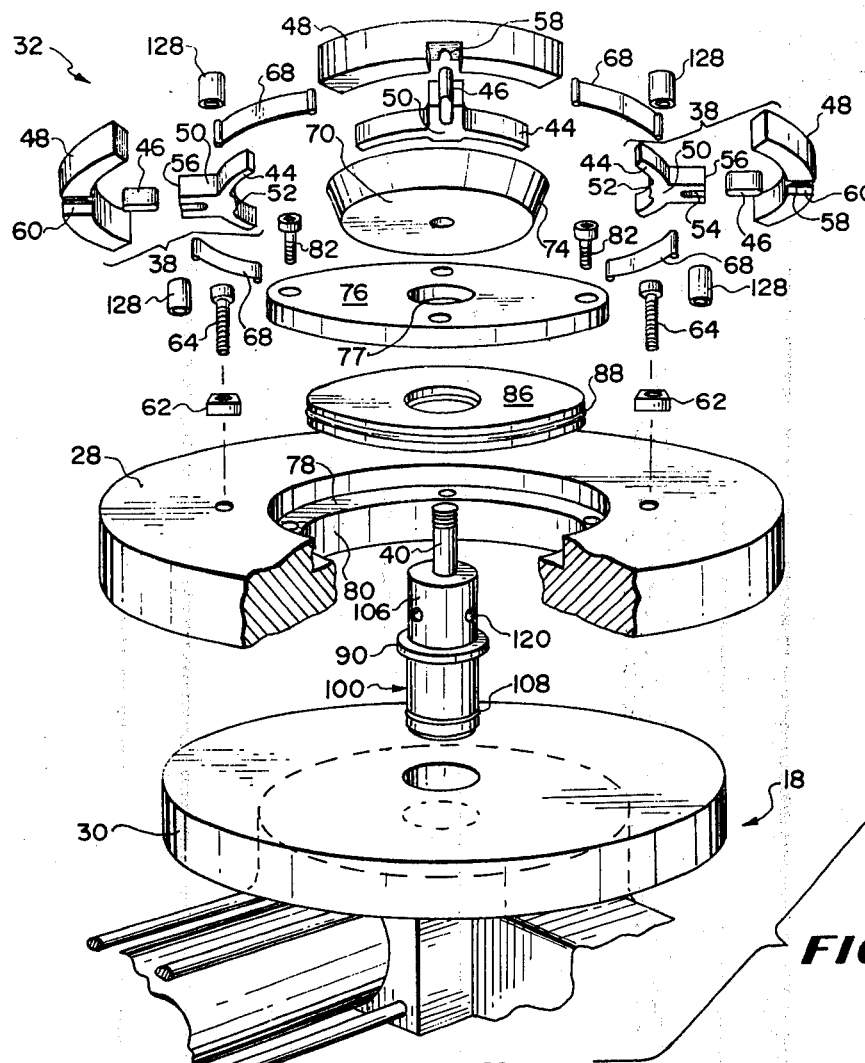
FIG. 3 is another exploded perspective view of the apparatus of this invention shown in association with the indexing table.
Figure 4:
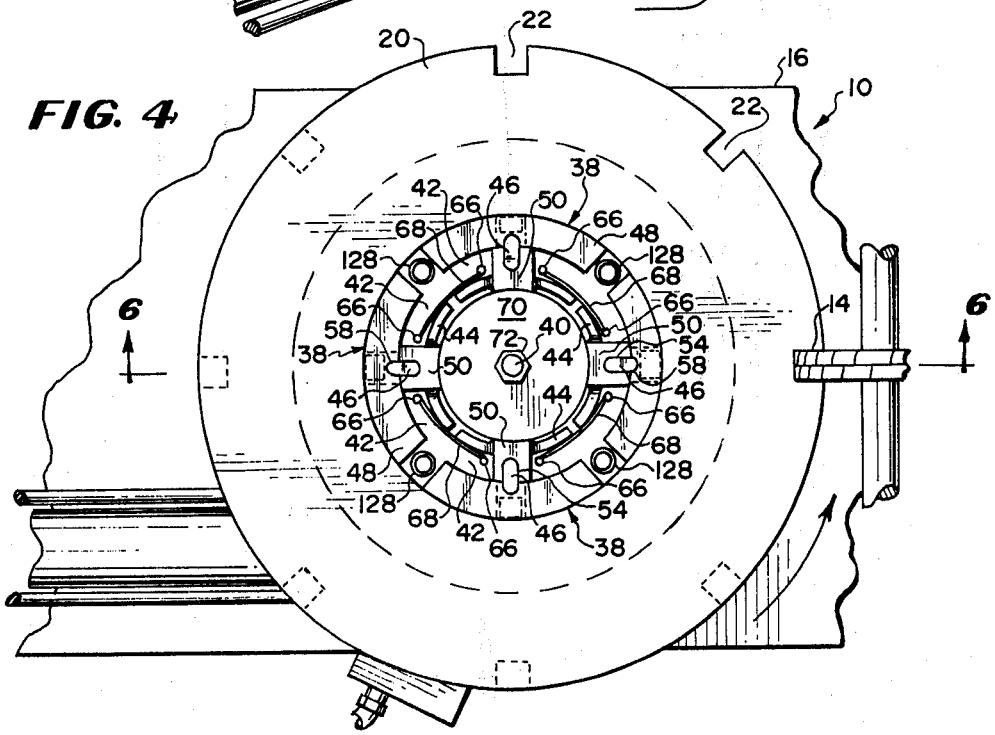
FIG. 4 is a plan view looking downward on the apparatus of this invention.

Mechanism 32 is shown in greater detail in FIGS. 2, 3, and 4, and includes a set of four generally arcuate gripping elements, identified generally by the reference character 38, arranged in a circle about a shaft 40 and coaxial therewith. Each of the elements 38 when viewed in perspective as in FIG. 2 or in plan view as in FIG. 4 appears to be in the form of a curved "H" with the center bridge of the "H" being radial relative to shaft 40. By this construction each element 38 has a pair of aligned arcuate-shaped slots 42 opening respectively to the opposite circumferential ends thereof so that the slots appear to form substantially an annular channel in the set of elements. Each element 38 in the embodiment shown includes three portions: an inner arcuate-shaped portion 44, cylindroid shaped key 46 and an outer arcuate-shaped portion 48.

Inner arcuate-shaped portion 44 has a widened center section 50 which has an angled side wall 52 on the concave side of arcuate-shaped portion 44 forming a camming surface, and a U-shaped notch 54 formed in side wall 56 of widened center portion 50 which is on the convex side of arcuate-shaped portion 44.

Each outer arcuate-shaped portion 48 includes a U-shaped notch 58 formed in the side wall thereof on the concave side and a guide channel 60 cut through the bottom surface along the radius of the arc formed by portion 48. The friction contact pins described in connection with FIG. 7 would be incorporated into the arcuate shaped portions 48 as will be explained.

Inner arcuate-shaped portion 44, cylindroid key 46 and outer arcuate-shaped portion 48 are closely fitted together and seated on baseplate 28 with a guide block 62, bolted to baseplate 28 by bolt 64 seated in guide channel 60 of outer portion 48 for guiding the movement of portion 48 in a radial direction with respect to shaft 40. Although the three portions comprising element 38 are shown as being separate, it is to be understood that they can be formed as a single part, or the three parts could be configured so as to enable them to be positively connected together. As shown in the drawings, elements 38 are readily separable in order to enable the parts to be individually replaced. Actually the fabrication of the individual parts by machining is more economical than if each element 38 were an integral whole.

Mounting posts 66 are secured to baseplate 28 and positioned with one mounting post in slot 42 of one element 38 and another in an adjacent slot 42, in the adjacent element 38. A biasing leaf spring 68 is mounted between mounting post 66 and bears against those portions of adjacent inner arcuate-shaped portions 44 in elements 38 which form the inner side walls of adjacent slots 42 for biasing the elements 38 radially inwardly towards shaft 40 to a contracted condition. Springs 69, shown dotted in FIG. 2, can be connected between posts 66 and outer arcuate-shaped portions 48 for biasing portions 48 and 46 to the contracted condition, but this has been found not to be necessary in one practical example constructed.

Gripping mechanism 32 further includes an actuating member 70, which in the preferred embodiment, is a camming disc. Camming disc 70 mounts on shaft 40 and is retained thereon by locking nut 72. Camming disc 70 is seated within the annular shaped opening formed by elements 38 with its camming side wall 74 bearing against the angled inner (camming) side wall 52 of inner arcuate-shaped portion 44 of each element 38.

Baseplate 28 is generally annular in shape and is secured to table 30 of indexing table 18 by any conventional means (not shown) such as bolts so that it rotates with table 30. A coverplate 76 having a center aperture 77, is fitted into an annular seat 78 formed in the center opening 80 of the baseplate 28 and secured in place by bolts 82. With baseplate 28 mounted on table 30 and coverplate 76 bolted in place, a disc-shaped air chamber 84 is formed within baseplate 28. A disc-shaped piston 86 is mounted in the air chamber 84 for vertical reciprocation and has an O-ring 88 seated in its outer periphery serving as a piston ring or seal in cooperation with the inner surface of the central opening 80 of the baseplate 28. The piston 86 is fixed to a central vertically arranged reciprocable post or column 100 by any suitable means such as for example the mating flange and seat structure identified at 90. The piston 86 has a suitably mating opening in its center to accommodate the column 100.

The table 30 has a vertically arranged central passageway which extends into the base section of indexing table 18 and within which the central post 100 is adapted to reciprocate and hence hence the cooperating dimensions are made to provide a relatively close sliding fit. The column 100 is in effect an integral part of the piston mechanism which includes the piston 86 and serves as a conduit for the air pressure which actuates the piston, as will be seen. The column 100 has a lower hollow part 102 which provides a central vertically extending passageway or chamber 104 and an upper solid part 106. The column 100 carries another O-ring on the exterior surface of the hollow part 102 as shown at 108 for the purpose of sealing the reciprocatory movement of the column 100 within the passageway 94 of the table 30. A central O-ring 110 is provided in the coverplate 76 in the opening 77 through which the solid part 106 of the central column 100 extends for the purpose of sealing the upper end of the air chamber 84 while enabling reciprocation of the solid part 106 through the coverplate 76.

As mentioned, the table 30 is a mechanical part of the indexing table and is indexed at the control of the operator by pneumatic structure which is known and which is not illustrated in order to keep the drawings uncluttered. As such, table 30 could be modified to provide the chamber 84 and the structure for securing the gripping mechanism from the teachings herein by those skilled in this art.

Figure 5:
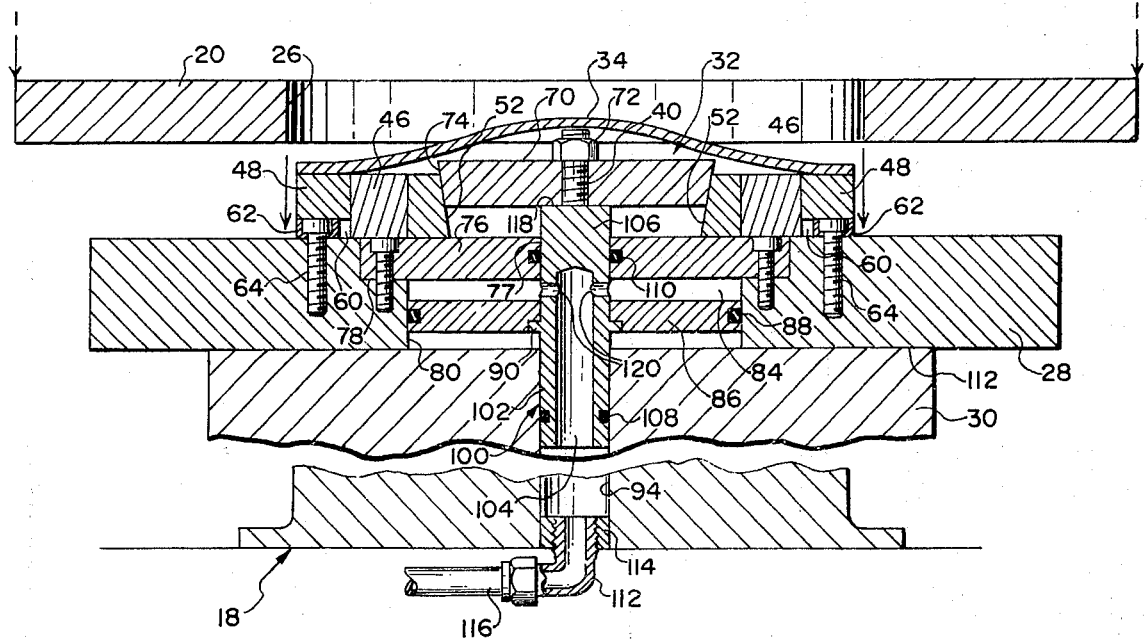
FIGS. 5 and 6 are sectional views of the apparatus of this invention taken along the section lines 6—6 of FIG. 4 in the indicated direction and showing the apparatus respectively with the gripping mechanism in a contracted condition and in a gripping condition.
Figure 6:
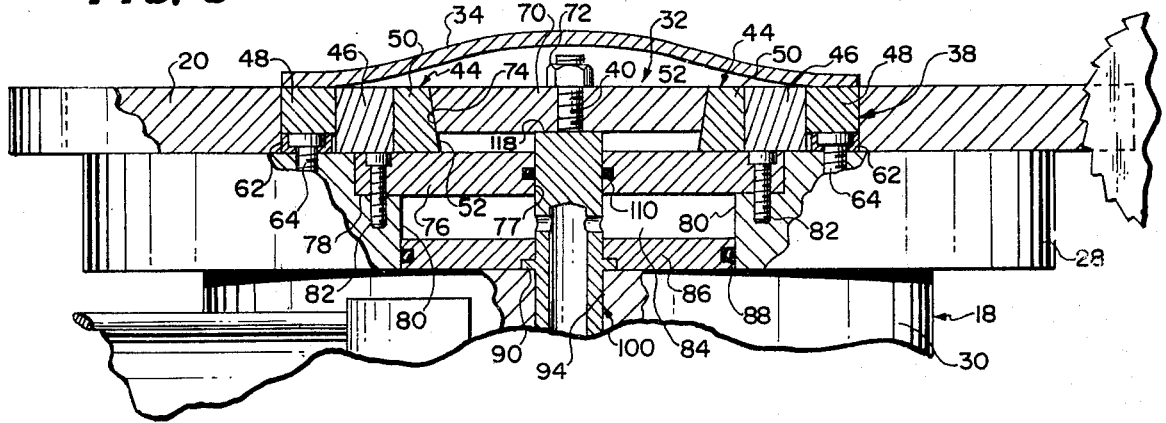

Examining the drawings and especially FIGS. 5 and 6, it is seen that table 30, baseplate 28 and all that it carries can rotate relative to the remaining portions of table 18 and that the connection represented by the chamber or passageway 104 is in nowise affected by such rotation. The column 100 freely rotates without loss of air pressure. Air is admitted to the passageway 94 by means of a fitting 112 set into a plug 114 at the bottom end of the passageway 94 and supplied with air from a line 116 through suitable controls (not shown).

The shaft or stud 40 which has previously been mentioned is carried by the solid part 106 as a reduced diameter extension thereof whereby to provide a shoulder 118. The camming disc 70 is seated on the shoulder 118 and held in place by the nut 72. Movement of the column 100 vertically is accompanied by movement of the camming disc 70 also. The upper end of the chamber 104 is provided with radial passageways 120 establishing communication between this passageway 104 and the air chamber 84, the end sought being to cause downward movement of the column 100 when air is admitted to the passageway 94. The chamber 84 above the piston 86 is sealed and when air is admitted into it the expansion forces the piston 86 downward. Air from the underside of the piston 84 is relieved by suitable ports (not shown) communicating with the atmosphere.

In operation, the workpiece 20 is laid onto the baseplate 28 as shown in FIG. 5 in a downward movement that enables the gripping mechanism 32 and the coverplate 34 to pass through the annular central opening 24. The dimensions are chosen so that this function may be accomplished freely. At this period in the operation of the apparatus, the air pressure within the line 116 has been relieved and the parts of the gripping mechanism as well as the column 100, piston 86 and camming disc 70 are somewhat as shown in FIG. 5. The disc 70 has been raised because the elements 38 have been contracted through the action of the leaf springs 68.

With the workpiece 20 seated, the operator manipulates the air valve (not shown) which applies air pressure to the interior of the passageway 94. This pressure is communicated by way of the passageway 104 and the passageways 120 to the chamber 84 and as a result the piston 86 moves downward. This carries the column 100 and the camming disc 70 also downward and by virtue of the mechanical advantage effected by the wedging effect of the camming disc surface 74 moving against the camming surfaces 52, great force is exerted radially outwardly against the inner arcuate parts 44. These transmit their outwardly directed force against the outer arcuate parts 48 which in turn move radially until they bear against the interior surface of the opening 26 of the workpiece 20. The final condition of the parts and mechanism is shown in section in FIG. 6 and in plan in FIG. 4.

The gripping mechanism 32 has expanded to its outermost diameter limited by the diameter of the opening 26. Air pressure is maintained and the milling operation can be commenced. Indexing can be effected without relieving the air pressure which enables the mechanism 32 to maintain its grip on the workpiece 20.

In a practical example, the movement of the camming disc 70 from its position in FIG. 5 to that of FIG. 6 was about 0.203 inches, the dimensions of the outer arcuate parts 48 being chosen fairly closely to conform in curvature to that of the opening 24 when in fully expanded condition. For production runs of workpieces with different diameters of interior openings, the outer arcuate parts 48 may be changed without the need for changing the other parts of the elements 38. Even these need not be changed in the event that adjustable friction contact pins are installed in the outer arcuate parts 48 as will be explained in connection with FIG. 7.

Simultaneous radial movement of all four of the outer arcuate parts 48 is ensured by reason of the guide blocks 62 which pass along the grooves 60 provided in the respective parts 48 on their bottom surfaces.

The geometry of the assembly is such that the leaf springs 68 are flexed radially outwardly when the workpiece is being gripped. The ends of each pair of adjacent inner arcuate parts 44 bear against the central portion of a respective spring 68 with considerable force. This situation obtains so long as the air pressure is applied by line 116.

With the workpiece 20 tightly gripped, the milling operation is commenced and continued around the workpiece until it is completed. At this time the air pressure is relieved. Air now escapes from the upper part of air chamber 84 by way of passages 120, chamber 104, passageway 94, etc. With release of pressure, leaf springs 68 now exert a radial force on all of the ends of the inner arcuate parts 44 moving these radially inwardly. This relieves radially outward pressure on the interior 26 of annular opening 24 of workpiece 20. At the same time the camming member 70 is forced upwardly moving the actuating column 100 and piston 86 upwardly. If connected together, parts 46 and 48 may also contract. If not connected, these parts are subject to easy movement. Removal of the workpiece normally is done by lifting in a non-vertical action that will cause slight radially inward movement of elements 38 so that the next workpiece can easily be engaged over the assembly of elements 38.

The coverplate 34 previously mentioned is in the form of a domed disc provided with performations that are arranged along the peripheral edge to receive the fastening bolts 36. The dome is required to clear the upper end of the stud 40 and its locking nut 72. The bolts 36 engage suitable threaded sockets in the baseplate 28 which are located between the peripheral ends of the outer arcuate parts 48. A bushing 128 is provided aligned with each socket (not shown in the drawings) disposed between the said peripheral ends of the parts 48. These bushings 128 are smaller in diameter that the distance between said ends so as not to interfere with free radial sliding movement of the parts 48. They are slightly longer than the vertical thickness of the arcuate parts 48 so that when the coverplate 34 is tightly engaged over the mechanism 32 there will be no interference with movement of the elements 38. This need be no more than a few thousands of an inch.

Figure 7:
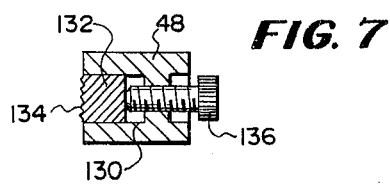
FIG. 7 is a detail of a modified form of the invention taken along line 7—7 of FIG. 2.

In FIG. 7 there is illustrated a modification of the invention which enables a single set of outer arcuate parts 48 to accommodate varying diameters of central annular openings 24 in workpieces. Sockets 130 are formed in the parts 48 extending radially thereof and opening to the outer surfaces. Friction pins 132 of carbide or other tough material are slidably mounted on these sockets with their roughened outer axial ends 134 slightly protruding. An adjusting screw 136 behind each pin 132 accessible from the interior surface of the part 48 enables the amount of the end 134 which protrudes to be adjusted. In this manner the effective maximum diameter to which the elements 38 can be expanded is adjustable. The carbide ends 134 provide a biting grip which, while it is limited to several points only, nevertheless is quite effective and retains its sharpness.

While the present invention has been described by reference to a specific example and other modifications can be made by those skilled in the art without actually departing from the invention as noted above, it is intended that the appended claims cover all variations that fall within the scope and spirit of the invention.

What is claimed and desired to secure by Letters Patent of the United States is:

1. Apparatus for gripping the interior surface of an annular opening in the center of a generally circular workpiece including in combination:
   a baseplate having a shaft passing therethrough perpendicular to the plane of said plate and means responsive to the application of fluid pressure axially to move said shaft;
   a set of generally arcuate gripping elements circularly positioned about said shaft and coaxial therewith, the elements being circumferentially spaced apart, said elements being slidable upon said baseplate radially of said shaft and each element having an interior radial camming surface and an exterior radial gripping surface, the combined gripping surface generally defining a cylinder, each element has oppositely opening slots on its peripheral ends spaced inwardly of the gripping surfaces,
   spring bias means secured to said baseplate and positioned thereon in relation to said gripping elements normally to exert radially inward pressure on the elements tending to contract the said elements to enable a decrease of the diameter of the cylinder defined by the combined gripping surfaces, the bias means comprise leaf spring means secured to said baseplate and extending between the opposed slots of adjacently positioned elements and bearing against the radially inward surfaces of said slots for exerting said radially inward pressure,
   an actuating member secured to said shaft above the baseplate and movable in response to said shaft movement to cooperate with the camming surfaces on said elements for moving said elements to slide radially outwardly against the inward pressure of said spring bias means whereby to tend to increase the diameter of the cylinder defined by said gripping surfaces to enable said exterior gripping elements frictionally to engage the annular opening of a workpiece disposed on said baseplate.

2. The apparatus as claimed in claim 1 in which said baseplate is horizontal and said shaft is vertical each element includes three separable parts comprising an inner arcuate part having a portion of said camming surface formed on its radial interior edge, an outer arcuate part having a portion of said gripping surface formed in its radial exterior edge and a coupling part radially arranged in engagement between said inner and outer arcuate parts for maintaining said parts in radial alignment during radial movement of said elements.

3. The apparatus as claimed in claim 2 in which said arcuate parts of each element have respective radial facing slots and said coupling part is an elongate member fitting into said slots and extending between parts.

4. The apparatus as claimed in claim 3 in which each outer part and the portion of the baseplate upon which it slides have respective cooperating radial groove and block means to guide said radial sliding movement.

5. The apparatus as claimed in claim 1 in which said gripping elements and baseplate have respective cooperating radial groove and block means to guide said radial sliding movement.

6. The apparatus as claimed in claim 1 in which said baseplate is horizontal and the shaft is vertical and said means responsive to the application of fluid pressure comprise a fluid cylinder having a piston arranged coaxially with said elements and including a coupling with said shaft passing through the elements, said fluid cylinder having means for connection to an external source of fluid pressure and operative when so connected to move downwardly, said actuating member comprising a camming disc adapted to be engaged with said camming surfaces in said downward movement.

7. The apparatus of claim 1 in combination with an indexing table, said baseplate being mounted to said table for rotary indexing and there being a rotary fluid pressure connection between said table and said means responsive to fluid pressure.

8. The apparatus as claimed in claim 7 in which said means responsive to the application of fluid pressure comprise a fluid cylinder formed in said baseplate and having a vertically reciprocable piston therein coaxial with said elements, a coupling with said shaft passing through the center of said elements, said table having means for bringing external fluid pressure to said rotary fluid pressure connection.

9. The apparatus as claimed in claim 8 in which said actuating member comprises a camming disc secured to said shaft and having a camming edge engaging said interior camming surfaces in a downward movement.

* * * * *